(12) United States Patent
Hirai

(10) Patent No.: US 11,498,883 B2
(45) Date of Patent: Nov. 15, 2022

(54) METHOD FOR PRODUCING CERAMIC COMPOSITE

(71) Applicant: NICHIA CORPORATION, Anan (JP)

(72) Inventor: Toshiyuki Hirai, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 59 days.

(21) Appl. No.: 17/103,041

(22) Filed: Nov. 24, 2020

(65) Prior Publication Data

US 2021/0163371 A1    Jun. 3, 2021

(30) Foreign Application Priority Data

Nov. 29, 2019 (JP) .............................. JP2019-216944

(51) Int. Cl.
| | | |
|---|---|---|
| *C09K 11/02* | (2006.01) | |
| *C09K 11/77* | (2006.01) | |
| *C04B 41/53* | (2006.01) | |
| *C04B 35/10* | (2006.01) | |

(52) U.S. Cl.
CPC .............. *C04B 41/53* (2013.01); *C04B 35/10* (2013.01); *C09K 11/7706* (2013.01); *C09K 11/7774* (2013.01); *C04B 2235/3222* (2013.01)

(58) Field of Classification Search
CPC ... C04B 41/53; C09K 11/7715; C09K 11/025; C09K 11/53
See application file for complete search history.

(56) References Cited

U.S. PATENT DOCUMENTS

| | | |
|---|---|---|
| 7,553,683 B2 | 6/2009 | Martin et al. |
| 8,748,921 B2 | 6/2014 | Martin et al. |
| 9,334,197 B2 | 5/2016 | Inamori et al. |
| 9,519,207 B2 | 12/2016 | Nakatsu et al. |
| 2005/0274967 A1 | 12/2005 | Martin et al. |
| 2009/0173960 A1 | 7/2009 | Martin et al. |
| 2013/0163225 A1 | 6/2013 | Nakatsu et al. |

(Continued)

FOREIGN PATENT DOCUMENTS

| | | |
|---|---|---|
| JP | 2010157637 A | 7/2010 |
| JP | 2012074739 A | 4/2012 |

(Continued)

OTHER PUBLICATIONS

Yanagida. Evaluation of Properties of YAG (Ce) Ceramic Scintillators. IEEE Transactions on Nuclear Science, vol. 52, No. 5, Oct. 2005 (Year: 2005).*

(Continued)

*Primary Examiner* — Matthew E. Hoban
(74) *Attorney, Agent, or Firm* — Hunton Andrews Kurth LLP

(57) ABSTRACT

A method for producing a ceramic composite includes: preparing a sintered body in a plate form containing a fluorescent material having a composition of a rare earth aluminate, and aluminum oxide; and eluting the aluminum oxide from the sintered body by contacting the sintered body with a basic substance, for example, contained in an alkali aqueous solution, and the dissolution amount of the fluorescent material eluted from the sintered body in the step of eluting the aluminum oxide is 0.5% by mass or less based on an amount of the fluorescent material contained in the sintered body as 100% by mass.

18 Claims, 13 Drawing Sheets

(56) References Cited

U.S. PATENT DOCUMENTS

2014/0138348 A1* 5/2014 Inamori .................. C04B 41/91
                                                          216/25
2016/0104824 A1   4/2016 Furuyama
2018/0216800 A1   8/2018 Yamanaka et al.

FOREIGN PATENT DOCUMENTS

| JP | 2013219123    * | 4/2012 |
|----|----------------|--------|
| JP | 2013134424 A   | 7/2013 |
| JP | 2013219123 A   | 10/2013 |
| JP | 2014234487 A   | 12/2014 |
| JP | 2016076685 A   | 5/2016 |
| WO | 2013008751 A1  | 1/2013 |
| WO | 2017056470 A1  | 4/2017 |

OTHER PUBLICATIONS

Smith. Attack of Glasses by Alkaline Solutions JACS 1949. 195-198 (Year: 1949).*

* cited by examiner

METHOD FOR PRODUCING CERAMIC COMPOSITE

CROSS-REFERENCE TO RELATED PATENT APPLICATION

This application claims priority to Japanese Patent Application No. 2019-216944, filed on Nov. 29, 2019, the entire disclosure of which is hereby incorporated by reference in its entirety.

BACKGROUND

Technical Field

The present disclosure relates to a method for producing a ceramic composite.

Description of Related Art

A light emitting diode (which may be hereinafter referred to as "LED") and a laser diode (which may be hereinafter referred to as "LD") have been widely used as a light emitting element.

A ceramic composite containing a fluorescent material is used as a wavelength converting member for performing wavelength conversion of light emitted from a light emitting element, such as LED and LD. A light emitting device including a light emitting element and a wave converting member is used in a wide range of fields as a light source for an interior illumination and an illumination for a vehicle, a light source for a backlight for a liquid crystal device, an illumination, a light source for a projector. In this specification, the "fluorescent material" is used in the same meaning as a "fluorescent phosphor".

As a wavelength converting member for wavelength conversion of light from a light emitting element, for example, Japanese Unexamined Patent Publication No. 2014-234487 describes a wavelength converting member containing glass having dispersed therein inorganic fluorescent material powder having a composition of a rare earth aluminate.

SUMMARY

It is desirable for a wavelength converting member formed of a ceramic composite such as that described in Japanese Unexamined Patent Publication No. 2014-234487 to have a further enhanced luminous flux.

An object of the present disclosure is to provide a method for producing a ceramic composite that can have an enhanced luminous flux.

One embodiment of the present disclosure relates to a method for producing a ceramic composite, including: preparing a sintered body in a plate form containing a fluorescent material comprising a rare earth aluminate, and aluminum oxide; and eluting the aluminum oxide from the sintered body by contacting the sintered body with a basic substance, for example, contained in an alkali aqueous solution, a dissolution amount of the fluorescent material eluted from the sintered body in the step of eluting the aluminum oxide being 0.5% by mass or less based on an amount of the fluorescent material contained in the sintered body as 100% by mass.

According to one embodiment of the present disclosure, a method for producing a ceramic composite that has an enhanced luminous flux can be provided.

DETAILED DESCRIPTION

The method for producing a ceramic composite according to the present disclosure will be described with reference to embodiments below. However, the embodiments described below are examples for practicing the technical concept of the present invention, and the present invention is not limited to the methods for producing a ceramic composite shown below. The relationship between the color names and the chromaticity coordinates, the relationship between the wavelength range of light and the color names of monochromatic light are in accordance with JIS Z8110.

Method for Producing Ceramic Composite

Figure 1:
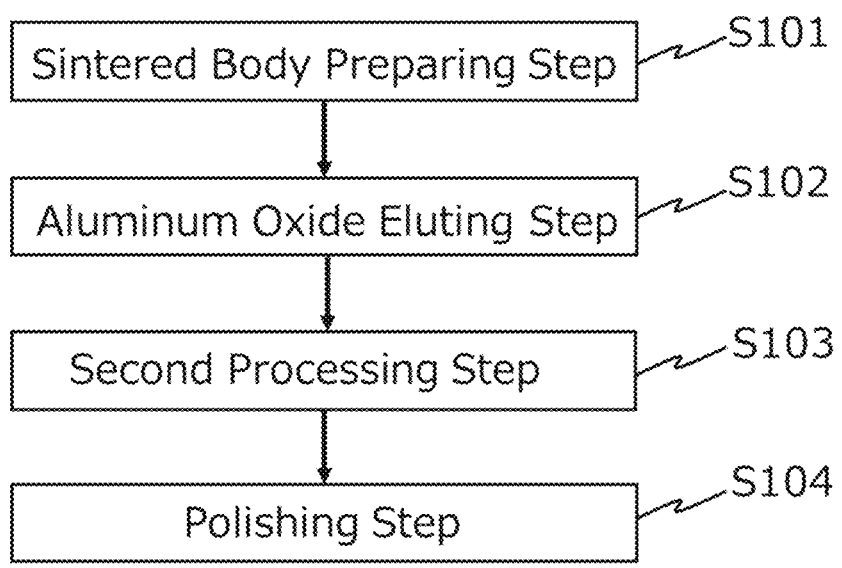
FIG. 1 is a flow chart showing an example of a method for producing a ceramic composite according to an embodiment of the present disclosure.

The method for producing a ceramic composite according to the embodiment includes: preparing a sintered body in a plate form containing a fluorescent material comprising or having a composition of a rare earth aluminate, and aluminum oxide; and eluting the aluminum oxide from the sintered body by contacting the sintered body with a basic substance contained in an alkali aqueous solution. FIG. 1 is a flow chart showing one example of the method for producing a ceramic composite according to the embodiment. The method for producing a ceramic composite includes a sintered body preparing step S101 and an aluminum oxide eluting step S102. The method for producing a ceramic composite may further include, after the aluminum oxide eluting step, a processing step S103 of cutting into a desired size or thickness and a polishing step S104 of flattening at least one surface of the ceramic composite after the aluminum oxide eluting step. The sintered body preparing step may include a processing step of cutting the resulting sintered body into a desired size or thickness in some cases. The processing step performed in the sintered body preparing step before the aluminum oxide eluting step may be referred to as a first processing step, and the processing step performed after the aluminum oxide eluting step may be referred to as a second processing step. As for the order of the second processing step S103 and the polishing step S104, the polishing step S104 may be performed after the second processing step S103, or the second processing step S103 may be performed after the polishing step S104.

Sintered Body Preparing Step

The sintered body may be obtained by calcining a mixture obtained by mixing a fluorescent material comprising or having a composition of a rare earth aluminate, and aluminum oxide. The sintered body is preferably obtained in such a manner that a mixture containing a fluorescent material comprising or having a composition of a rare earth aluminate, and aluminum oxide is molded into a plate form to provide a molded body, and the molded body is calcined to provide the sintered body.

Fluorescent Material Having Composition of Rare Earth Aluminate

The fluorescent material having a composition of a rare earth aluminate preferably contains at least one kind of a rare earth element Ln selected from the group consisting of Y, Lu, Gd, and Tb, Ce, Al, O (oxygen), and depending on necessity Ga, in which the molar ratio of Ce is a product of 3 and a parameter a in a range of more than 0 and 0.22 or less, the molar ratio of Al is a product of 5 and a parameter c in a range of more than 0 and 1.1 or less, and the molar ratio of Ga contained depending on necessity is a product of 5 and a parameter b in a range of 0 or more and 0.4 or less. In the description herein, the "molar ratio" means a molar ratio of the element in 1 mol of the composition of a rare earth aluminate.

The fluorescent material having a composition of a rare earth aluminate preferably has a composition represented by the following formula (I).

$$(Ln_{1-a}Ce_a)_3(Al_cGa_b)_5O_{12} \qquad (I)$$

In the formula (I), Ln represents at least one kind of a rare earth element selected from the group consisting of Y, Lu, Gd, and Tb, and a, b, and c satisfy $0<a\leq0.22$, $0\leq b\leq0.4$, $0<c\leq1.1$, and $0.9\leq b+c\leq1.1$.

In the composition represented by the formula (I), Ln represents at least one kind of a rare earth element selected from the group consisting of Y, Lu, Gd, and Tb, and may contain two or more kinds of the rare earth elements. Ce is an activating element for the fluorescent material, and the product of 3 and the parameter a shows the molar ratio of Ce in the composition represented by the formula (I). The parameter a is more preferably in a range of 0.00005 or more and 0.21 or less ($0.005\times10^{-2}\leq a\leq0.21$), and further preferably in a range of 0.0001 or more and 0.20 or less ($0.01\times10^{-2}\leq a\leq0.20$). In the composition represented by formula (I), the product of 5 and the parameter b shows the molar ratio of Ga. In the composition represented by formula (I), the parameter b may be in a range of 0.00001 or more and 0.35 or less ($0.001\times10^{-2}\leq b\leq0.35$), and may be in a range of 0.00005 or more and 0.30 or less ($0.005\times10^{-2}\leq b\leq0.30$), for the achievement of the desired particle diameter and the wavelength conversion to the desired color tone. In the composition represented by formula (I), the product of 5 and the parameter c shows the molar ratio of Al. The parameter c is more preferably in a range of 0.5 or more and 1.1 or less ($0.5\leq c\leq1.1$), and further preferably in a range of 0.6 or more and 1.0 or less ($0.6\leq c\leq1.0$).

The fluorescent material having a composition of a rare earth aluminate preferably has an average particle diameter in a range of 5 μm or more and 40 μm or less, more preferably in a range of 10 μm or more and 35 μm or less, and further preferably in a range of 10 μm or more and 30 μm or less. In the case where the average particle diameter of the fluorescent material is in a range of 5 μm or more and 40 μm or less, the fluorescent material can be disposed homogeneously in the sintered body, and the sintered body having a high relative density can be obtained. The average particle diameter of the fluorescent material may be measured by the Fisher Sub-Sieve Sizer method (which may be hereinafter referred to as the FSSS method), and the average particle diameter measured by the FSSS method may be referred to as a Fisher Sub-Sieve Sizer's number. The FSSS method is a method of obtaining a particle diameter by measuring a specific surface area using a flow resistance of air by the air permeation method.

In the mixture, the molded body, or the sintered body containing the fluorescent material having a composition of a rare earth aluminate, and aluminum oxide, the mixing ratios of the fluorescent material having a composition of a rare earth aluminate, and the aluminum oxide based on the total amount of the fluorescent material having a composition of a rare earth aluminate, and the aluminum oxide as 100% by mass are substantially not changed through the molding and calcining. In the mixture, the molded body, and the sintered body, the content of the fluorescent material having a composition of a rare earth aluminate is preferably in a range of 1% by mass or more and 50% by mass or less, more preferably in a range of 3% by mass or more and 48% by mass or less, further preferably in a range of 5% by mass or more and 45% by mass or less, and particularly preferably in a range of 8% by mass or more and 40% by mass or less, based on the total amount of the fluorescent material having a composition of a rare earth aluminate, and the aluminum oxide as 100% by mass. In the case where the content of the fluorescent material is in a range of 1% by mass or more and 50% by mass or less based on the total amount of the fluorescent material having a composition of a rare earth aluminate, and the aluminum oxide, the sintered body having a high relative density can be obtained, and the ceramic composite having enhanced light emission characteristics can be produced.

Aluminum Oxide

Aluminum oxide is a material constituting the matrix of the sintered body and the ceramic composite.

The content of the aluminum oxide is preferably in a range of 50% by mass or more and 99% by mass or less, more preferably in a range of 52% by mass or more and 97% by mass or less, further preferably in a range of 55% by mass or more and 95% by mass or less, and particularly preferably 60% by mass or more and 92% by mass or less, based on the total amount of the fluorescent material having a composition of a rare earth aluminate, and the aluminum oxide as 100% by mass.

The content of the aluminum oxide may be in a range of 50% by mass or more and 80% by mass or less, and may be in a range of 55% by mass or more and 75% by mass or less, based on the total amount of the fluorescent material having a composition of a rare earth aluminate, and the aluminum oxide as 100% by mass. The content of the aluminum oxide may be in a range of 80% by mass or more and 99% by mass or less, and may be in a range of 85% by mass or more and 97% by mass or less, based on the total amount of the fluorescent material having a composition of a rare earth aluminate, and the aluminum oxide as 100% by mass. In the case where the content of the aluminum oxide is in a range of 50% by mass or more and 99% by mass or less based on the total amount of the fluorescent material having a composition of a rare earth aluminate, and the aluminum oxide, the sintered body having a high relative density can be obtained, and the ceramic composite having enhanced light emission characteristics can be produced.

In the sintered body preparing step, examples of the method for providing the sintered body include a production method including a powder mixing step of mixing raw materials in a powder form containing the fluorescent material having a composition of a rare earth aluminate, and the aluminum oxide, a molded body preparing step of molding the powder mixture to provide the molded body, and a calcining step of calcining the molded body to provide the sintered body. The sintered body preparing step may include an annealing step of performing a heat treatment at a temperature of the calcining temperature or less, after the calcining step. The sintered body preparing step may also include the first processing step of cutting the sintered body into a desired size or thickness, after the annealing step or before the annealing step. The production method for providing the sintered body is also described in detail in Japanese Patent Application No. 2018-73505, and reference may be made to the description therein.

In the powder mixing step, the fluorescent material having a composition of a rare earth aluminate, and the aluminum oxide may be mixed to provide a powder mixture containing the fluorescent material having a composition of a rare earth aluminate, and the aluminum oxide. In the powder mixture, the fluorescent material having a composition of a rare earth aluminate, and the aluminum oxide are preferably homogeneously dispersed in each other. The homogeneous dispersion referred herein does not require a strict homogeneity, but means that the fluorescent material and the aluminum oxide exist in the powder mixture in a homogeneous state that can be considered based on the technical common sense. The powder may be mixed with a mortar and a pestle. The powder may be mixed with a mixing medium, such as a ball mill. A small amount of a molding aid, such as water or ethanol, may be used for facilitating the mixing of the powder and facilitating the molding of the powder after mixing. The molding aid is preferably a material that is readily evaporated in the subsequent calcining step, and in the case where the molding aid is used, the amount of the molding aid is preferably 10% by mass or less, more preferably 8% by mass or less, and further preferably 5% by mass or less, based on the amount of the powder as 100% by mass.

In the molded body preparing step, the resulting powder mixture may be molded into a plate form to provide the molded body. The molding method of the powder may be a known method, such as a press molding method. The press molding may be performed, for example, by metal mold pressing or cold isostatic pressing (which may be hereinafter referred to as CIP). Two methods may be used as the molding method, and CIP may be performed after metal mold pressing, for regulating the shape of the molded body. In the CIP, the molded body is preferably pressed by a cold hydrostatic isostatic pressing method using water as the medium.

In the calcining step, the resulting molded body may be calcined to provide the sintered body. In the calcining step, the molded body may be calcined in the air atmosphere. The air atmosphere is an atmosphere containing oxygen, and the content of oxygen in the atmosphere may be 5% by volume or more, may be 10% by volume or more, may be 15% by volume or more, and may be the air (having an oxygen content of 20% by volume or more).

The calcining temperature is preferably in a range of 1,400° C. or more and 1,800° C. or less, more preferably in a range of 1,500° C. or more and 1,800° C. or less, and further preferably in a range of 1,600° C. or more and 1,780° C. or less. In the case where the calcining temperature is 1,400° C. or more, the sintered body having a high relative density can be obtained. In the case where the calcining temperature is 1,800° C. or less, the surfaces of aluminum oxide in the form of particles can be fused to form a matrix with the aluminum oxide without melting the powder constituting the molded body, so as to provide the sintered body having the fluorescent material in the state where the grain boundaries thereof can be clearly confirmed, contained in the matrix of the aluminum oxide. After providing the sintered body, the sintered body may be subjected to hot isostatic pressing (which may be herein after referred to as HIP). In the case where HIP is performed, the relative density of the sintered body may be increased in some cases. In the case where the sintered body has a high relative density, HIP may not be performed.

In the molded body or the sintered body, the fluorescent material having a composition of a rare earth aluminate, and the aluminum oxide are preferably homogeneously dispersed in the molded body or the sintered body. The homogeneous dispersion referred herein does not require a strict homogeneity, but means that the fluorescent material and the aluminum oxide exist in a homogeneous ratio that can be considered based on the technical common sense, over the entire region of the molded body or the sintered body. In the case where the fluorescent material and the aluminum oxide exist in the molded body or the sintered body in a homogeneously dispersed state, the aluminum oxide existing close to the surface of the sintered body can be eluted in the subsequent aluminum oxide eluting step, so as to enhance the luminous flux of the resulting ceramic composite.

After providing the sintered body, the sintered body may be annealed at a heat treatment temperature lower than the calcining temperature depending on necessity. The annealing is preferably performed in a reducing atmosphere. The annealing of the sintered body in a reducing atmosphere can reduce the oxidized activating element in the fluorescent material having a composition of a rare earth aluminate. The reducing atmosphere may be an atmosphere that contains at least one kind of a rare gas selected from the group consisting of helium, neon, and argon or nitrogen gas, and hydrogen gas or carbon monoxide gas, and the atmosphere preferably contains at least argon gas or nitrogen gas, and hydrogen gas or carbon monoxide gas.

The temperature for the annealing is a temperature that is lower than the calcining temperature, and is preferably in a range of 1,000° C. or more and 1,600° C. or less, more preferably in a range of 1,000° C. or more and 1,500° C. or less, and further preferably in a range of 1,100° C. or more and 1,400° C. or less. In the case where the temperature for the annealing is a temperature lower than the calcining temperature and is in a range of 1,000° C. or more and 1,600° C. or less, the oxidized activating element contained in the fluorescent material in the sintered body can be reduced to suppress the luminous flux from being decreased.

In the case where the first processing step is performed for cutting the resulting sintered body into a desired size or thickness, for example, blade dicing, laser dicing, and wire saw dicing may be employed. The resulting sintered body is in a plate form, and the thickness of the sintered body having a plate form is preferably in a range of 1 μm or more and 1,500 μm or less, more preferably in a range of 10 μm or more and 1,400 μm or less, and further preferably in a range of 30 μm or more and 1,300 μm or less. In the case where the thickness of the resulting sintered body in a plate form is in a range of 1 μm or more and 1,500 μm or less, the aluminum oxide on the surface of the sintered body can be eluted by contacting the sintered body with a basic substance in the subsequent step, and thereby the fluorescent material can be exposed without the decrease of the strength of the sintered body.

The relative density of the sintered body is preferably 90% or more, more preferably 93% or more, and further preferably 95% or more. The relative density of the sintered body is preferably 100%, and may be 99% or less. With a low relative density of the sintered body, an alkali aqueous solution may invade the interior of the sintered body, and thereby aluminum oxide as the matrix may be eluted not only on the surface but also in the interior thereof, making the sintered body brittle in some cases.

The relative density of the sintered body can be calculated by dividing the apparent density of the sintered body by the true density of the sintered body. Specifically, the relative density can be calculated by the following expression (1).

Relative density (%) of sintered body=(Apparent density of sintered body÷True density of sintered body)×100    (1)

The true density of the sintered body can be calculated by the following expression (2) from the mass ratio $P_m$ (% by mass) of the fluorescent material having a composition of a rare earth aluminate contained in the sintered body, the true density $P_d$ (g/cm$^3$) of the fluorescent material having a composition of a rare earth aluminate, the mass ratio $A_m$ (% by mass) of aluminum oxide contained in the sintered body, and the true density $A_d$ (g/cm$^3$) of aluminum oxide.

$$\text{True density of sintered body} = \frac{P_d \times A_d \times 100}{(A_d \times P_m) + (P_d \times A_m)} \quad (2)$$

$P_m$: Mass ratio (% by mass) of fluorescent material having composition of rare earth aluminate $P_d$: True density (g/cm$^3$) of fluorescent material having composition of rare earth aluminate $A_m$: Mass ratio (% by mass) of aluminum oxide $A_d$: True density (g/cm$^3$) of aluminum oxide $P_m + A_m = 100$% by mass The apparent density of the sintered body can be calculated by the following expression (3) from the mass (g) of the sintered body and the volume (cm$^3$) of the sintered body obtained by the Archimedes method.

Apparent density (g/cm$^3$) sintered body=Mass (g) of sintered body÷Volume (cm$^3$) of sintered body (Archimedes' method)    (3)

Assuming that the density of the sintered body is 100%, the porosity of the sintered body may be a value obtained by subtracting the relative density of the sintered body from 100%, i.e., the density of the sintered body.

Aluminum Oxide Eluting Step

The method for producing a ceramic composite includes a step of eluting the aluminum oxide from the sintered body by contacting the sintered body with a basic substance contained in an alkali aqueous solution.

The sintered body may be contacted with the basic substance contained in the alkali aqueous solution by immersing the sintered body in the alkali aqueous solution in such a manner that at least one surface as the principal surface of the sintered body in a plate form is contacted with the alkali aqueous solution. The principal surface of the sintered body in a plate form means the surface having the largest area among the surfaces constituting the sintered body in a plate form. The sintered body in a plate form may have two principal surfaces facing each other. Both the two principal surfaces of the sintered body in a plate form facing each other may be contacted with the basic substance by immersing the sintered body in the alkali aqueous solution in such a manner that both the principal surfaces of the plate material are contacted with the alkali aqueous solution.

In the step of eluting the aluminum oxide, the dissolution amount of the fluorescent material eluted from the sintered body is 0.5% by mass or less based on an amount of the fluorescent material contained in the sintered body as 100% by mass. The fluorescent material having a composition of a rare earth aluminate contains an aluminate salt in the composition thereof, and therefore in the case where the sintered body is contacted with the basic substance, a small amount of the fluorescent material may also be dissolved and eluted from the sintered body in some cases. In the step of eluting the aluminum oxide, the dissolution amount of the fluorescent material eluted from the sintered body is preferably 0.4% by mass or less, more preferably 0.3% by mass or less, and further preferably 0.2% by mass or less, based on the amount of the fluorescent material contained in the sintered body as 100% by mass. In the step of eluting the aluminum oxide, there may be a case where the fluorescent material is not eluted from the sintered body, and the dissolution amount of the fluorescent material eluted from the sintered body may be 0% by mass, may be 0.0001% by mass (1 ppm by mass) or more, and may be 0.001% by mass (10 ppm by mass) or more, based on the amount of the fluorescent material contained in the sintered body as 100% by mass.

The dissolution amount of the fluorescent material eluted from the sintered body may be obtained in such a manner that the amount of the element contained in the fluorescent material eluted in the alkali aqueous solution, from which the sintered body has been taken out, is measured, for example, with an induction coupled plasma (ICP) emission spectrophotometer (manufactured, for example, by Hitachi High-Tech Science Corporation), and the dissolution amount of the fluorescent material eluted from the sintered body is calculated from the measured amount of the element based on the amount of the fluorescent material contained in the sintered body as 100% by mass. For example, the amount of the rare earth element Ln contained in the fluorescent material having a composition represented by the formula (I) is measured, and the dissolution amount of the fluorescent material eluted from the sintered body is calculated from the measured amount of the rare earth element Ln by the following expression (4). In the expression (4), the coefficient Kc1 can be calculated by the following expression (5) for the fluorescent material having a composition represented by the formula (I).

Dissolution amount of fluorescent material (% by mass)=(alkali aqueous solution (mL)×amount of element Ln eluted in alkali aqueous solution $$\text{(g/mL)} \times \text{coefficient } Kc1 : (\text{mass of sintered body (g)} \times \text{content of fluorescent material in sintered body (\% by mass)}) \times 100 \quad (4)$$

$$\text{Coefficient } Kc1 = (\text{Formula weight of fluorescent material} \div \text{atomic weight of element Ln}) \div (1-a) \div 3 \quad (5)$$

In the expression (5), a represents the molar ratio of Ce in the formula (1).

The fluorescent material that is eluted from the sintered body also contains aluminum oxide ($Al_2O_3$). The amount of the aluminum oxide ($Al_2O_3$) in the dissolution amount of the fluorescent material eluted from the sintered body may be obtained in such a manner that the amount of the element contained in the fluorescent material is measured, for example, with an ICP emission spectrophotometer, and the amount of the aluminum oxide is calculated from the measured amount of the element. For example, the amount of the rare earth element Ln contained in the fluorescent material having a composition represented by the formula (I) is measured, and the amount of the aluminum oxide is calculated from the measured amount of the rare earth element Ln by the following expression (6). In the expression (6), the coefficient Kc2 can be calculated by the following expression (7) for the fluorescent material having a composition represented by the formula (I).

$$\text{Amount of } Al_2O_3 \text{ in dissolution amount of fluorescent material (g)} = \text{alkali aqueous solution (mL)} \times \text{amount of element Ln elated in alkali aqueous solution (g/mL)} \times \text{coefficient } Kc2 \quad (6)$$

$$\text{Coefficient } Kc2 = (84.97 \div \text{atomic weight of Ln}) \div (1-a) \times c \quad (7)$$

In the expression (7), a represents the molar ratio of Ce in the formula (1) and c represents the molar ratio of Al in the formula (1).

In the step of eluting the aluminum oxide, the dissolution amount of the aluminum oxide ($Al_2O_3$) eluted from the sintered body is preferably in a range of 0.2% by mass or more and 30% by mass or less, more preferably in a range of 0.3% by mass or more and 29% by mass or less, further preferably in a range of 0.4% by mass or more and 27% by mass or less, and particularly preferably in a range of 0.5% by mass or more and 25% by mass or less, based on the amount of the aluminum oxide contained in the sintered body as 100% by mass. In the case where the aluminum oxide is eluted in an amount in a range of 0.2% by mass or more and 30% by mass or less based on the amount of the aluminum oxide contained in the sintered body as 100% by mass by contacting the sintered body with the basic substance, the aluminum oxide as the matrix of the sintered body is eluted, and thereby a part of the fluorescent material having a composition of a rare earth aluminate embedded in the matrix is exposed on the surface of the sintered body. Accordingly, the ceramic composite can suppress the reflection and scattering of light caused by the aluminum oxide existing on the surface of the sintered body. Furthermore, the ceramic composite can perform the wavelength conversion of incident light by the fluorescent material, a part of which is exposed in the surface direction from the aluminum oxide, and thus the luminous flux of the ceramic composite can be enhanced. Moreover, in the case where the aluminum oxide is eluted in an amount in a range of 0.2% by mass or more and 30% by mass or less based on the amount of the aluminum oxide contained in the sintered body as 100% by mass, it is estimated that light is efficiently scattered inside the ceramic composite with voids formed through the partial elution of the aluminum oxide existing inside the sintered body, and the scattered light is efficiently subjected to the wavelength conversion by the fluorescent material, resulting in the enhanced luminous flux of the ceramic composite. In the case where the dissolution amount of the aluminum oxide eluted from the sintered body is less than 0.2% by mass, the aluminum oxide constituting the matrix of the ceramic composite may not be substantially eluted so that voids may fail to form, and it may be difficult to accelerate the reflection and scattering of light by voids of the ceramic composite. In the case where the dissolution amount of the aluminum oxide eluted from the sintered body exceeds 30% by mass, it is estimated that the amount of voids of the ceramic composite may be too large such that the scattering of light by the voids becomes too large, and the amount of light directed to the interior of the ceramic composite is increased to lower the luminous flux. Furthermore, in the case where the dissolution amount of the aluminum oxide exceeds 30% by mass, the surface area of the fluorescent material that is exposed from the matrix constituted by the aluminum oxide is increased due to the too large dissolution amount of the aluminum oxide, which results in a possibility that the particles of the fluorescent material are dropped off the ceramic composite due to the loss of the support by the matrix therefor.

In the case where the sintered body contains the aluminum oxide in an amount in a range of 50% by mass or more and less than 80% by mass, in the step of eluting the aluminum oxide, the dissolution amount of the aluminum oxide eluted from the sintered body is preferably in a range of 0.2% by mass or more and 30% by mass or less, more preferably in a range of 0.5% by mass or more and 29% by mass or less, further preferably in a range of 0.7% by mass or more and 27% by mass or less, and particularly preferably in a range of 1% by mass or more and 25% by mass or less. In the case where the sintered body contains the aluminum oxide in an amount in a range of 50% by mass or more and less than 80% by mass, since the amount of the aluminum oxide is relatively small, whereas the amount of the fluorescent material is relatively large, a part of the fluorescent material having a composition of a rare earth aluminate embedded in the matrix is exposed in the vicinity of the surface of the sintered body, so as to suppress the reflection and scattering of light caused by the aluminum oxide existing in the vicinity of the surface, and the wavelength conversion of the incident light can be performed efficiently by the fluorescent material, resulting in the ceramic composite having a high luminous flux. In the case where the sintered body contains the aluminum oxide in an amount in a range of 50% by mass or more and less than 80% by mass, since the amount of the aluminum oxide is relatively small, whereas the amount of the fluorescent material is relatively large, the scattering of light can be enhanced by voids formed through the elution of the aluminum oxide from the interior of the sintered body, and the wavelength conversion of the scattered light can be performed efficiently by the fluorescent material, resulting in the ceramic composite having a high luminous flux. The amount of the aluminum oxide contained in the sintered body is the same as the amount of the aluminum oxide with respect to the total amount of the aluminum oxide and the fluorescent material having a composition of a rare earth aluminate in the raw material.

In the case where the sintered body contains the aluminum oxide in an amount in a range of 80% by mass or more and 99% by mass or less, in the step of eluting the aluminum oxide, the dissolution amount of the aluminum oxide eluted from the sintered body is preferably in a range of 0.2% by mass or more and 3% by mass or less, more preferably in a range of 0.3% by mass or more and 2.9% by mass or less, further preferably in a range of 0.4% by mass or more and 2.9% by mass or less, and particularly preferably in a range of 0.5% by mass or more and 2.8% by mass or less. In the case where the sintered body contains the aluminum oxide in an amount in a range of 80% by mass or more and 99% by mass or less, since the amount of the aluminum oxide contained in the sintered body is relatively large, whereas the amount of the fluorescent material is relatively small, a part of the fluorescent material having a composition of a rare earth aluminate embedded in the matrix is exposed by eluting the aluminum oxide from the surface of the sintered body in an amount in a range of 0.2% by mass or more and 3% by mass or less, and the wavelength conversion of the incident light can be performed efficiently, resulting in the ceramic composite having a high luminous flux.

The dissolution amount of the aluminum oxide ($Al_2O_3$) eluted from the sintered body may be calculated in such a manner that the amount of aluminum (Al) eluted in the alkali aqueous solution, from which the sintered body has been taken out, is measured, for example, with an induction coupled plasma (ICP) emission spectrophotometer (manufactured, for example, by Hitachi High-Tech Science Corporation), from which the amount of $Al_2O_3$ in the dissolution amount of the fluorescent material eluted from the sintered body is subtracted. The dissolution amount of the aluminum oxide ($Al_2O_3$) eluted from the sintered body can be expressed in terms of mass ratio based on the amount of the aluminum oxide ($Al_2O_3$) contained in the sintered body as 100% by mass. Specifically, the dissolution amount of the aluminum oxide ($Al_2O_3$) eluted from the sintered body can be calculated by the following expression (8).

Dissolution amount of $Al_2O_3$ (% by mass)=(alkali aqueous solution (mL)×amount of element Al eluted in alkali aqueous solution (g/mL)×1.890 amount of $Al_2O_3$ in dissolution amount of fluorescent material (g)):(mass of sintered body (g)×content of $Al_2O_3$ in sintered body (% by mass))×100  (8)

Examples of the basic substance contained, for example, in the alkali aqueous solution include at least one selected from the group consisting of sodium hydroxide, potassium hydroxide, and lithium hydroxide. The basic substance is preferably at least one selected from the group consisting of sodium hydroxide and potassium hydroxide, which are readily soluble in water. Water used as a solvent of the alkali aqueous solution may be deionized water.

The alkali aqueous solution contains the basic substance preferably in an amount in a range of 3% by mass or more and 70% by mass or less, more preferably in an amount in a range of 5% by mass or more and 65% by mass or less, and further preferably in an amount in a range of 10% by mass or more and 60% by mass or less. In the case where the content of the basic substance in the alkali aqueous solution is in a range of 3% by mass or more and 70% by mass or less, the aluminum oxide can be eluted from the sintered body to provide the ceramic composite having a high luminous flux.

The temperature, at which the sintered body is contacted with the basic substance, is preferably in a range of 120° C. or more and 200° C. or less, more preferably in a range of 130° C. or more and 190° C. or less, and further preferably in a range of 140° C. or more and 180° C. or less. In the case where the temperature, at which the sintered body is contacted with the basic substance, is in a range of 120° C. or more and 200° C. or less, the ceramic composite obtained through elution of the aluminum oxide from the sintered body may have enhanced luminous flux.

In the case where the sintered body contains the aluminum oxide in an amount in a range of 50% by mass or more and less than 80% by mass, the temperature, at which the sintered body is contacted with the basic substance, is preferably in a range of 120° C. or more and 180° C. or less, more preferably in a range of 130° C. or more and 170° C. or less, and further preferably in a range of 140° C. or more and 165° C. or less. In the case where the temperature, at which the sintered body is contacted with the basic substance, is in a range of 120° C. or more and 180° C. or less, the aluminum oxide can be eluted from the surface of the sintered body to enhance the luminous flux.

In the case where the sintered body contains the aluminum oxide in an amount in a range of 80% by mass or more and 99% by mass or less, the temperature, at which the sintered body is contacted with the basic substance, is preferably in a range of 120° C. or more and 200° C. or less, more preferably in a range of 130° C. or more and 190° C. or less, and further preferably in a range of 140° C. or more and 180° C. or less. In the case where the temperature, at which the sintered body is contacted with the basic substance, is in a range of 120° C. or more and 200° C. or less, the aluminum oxide can be eluted from the surface of the sintered body and the interior of the sintered body to enhance the luminous flux.

The pressure, under which the sintered body is contacted with the basic substance, may be the saturated vapor pressure of water or less at the temperature at which the sintered body is contacted with the basic substance. More specifically, the pressure, under which the sintered body is contacted with the basic substance, in terms of gauge pressure is preferably in a range of 150 kPa or more and 1,600 kPa or less, more preferably in a range of 200 kPa or more and 1,400 kPa or less, and further preferably in a range of 300 kPa or more and 1,200 kPa or less. In the case where the pressure, under which the sintered body is contacted with the basic substance, is the saturated vapor pressure of water or less at the temperature at which the sintered body is contacted with the basic substance, more specifically in a range of 150 kPa or more and 1,600 kPa or less in terms of gauge pressure, the aluminum oxide can be eluted from the sintered body.

The period of time, for which the sintered body is contacted with the basic substance, is preferably 1 hour or more and 96 hours or less. In the case where the period of time, for which the sintered body is contacted with the basic substance, is 1 hour or more and 96 hours or less, the ceramic composite with enhanced luminous flux can be obtained by eluting the aluminum oxide from the sintered body. The period of time, for which the sintered body is contacted with the basic substance may also be influenced by the temperature, at which the sintered body is contacted with the basic substance. In the case where the temperature, at which the sintered body is contacted with the basic substance, is in a range of 120° C. or more and 160° C. or less, the period of time, for which the sintered body is contacted with the basic substance, is preferably 5 hours or more and 96 hours or less, more preferably 10 hours or more, further preferably 15 hours or more, and particularly preferably 20 hours or more. In the case where the temperature, at which the sintered body is contacted with the basic substance, is in a range of more than 160° C. and 200° C. or less, the period of time, for which the sintered body is contacted with the basic substance, is preferably 1 hour or more and 80 hours or less, more preferably 2 hours or more and 70 hours or less, further preferably 3 hours or more and 50 hours or less, and particularly preferably 3 hours or more and 30 hours or less.

Processing Step

The method for producing a ceramic composite may include the second processing step of cutting the resulting ceramic composite into a desired size or thickness, after the step of eluting the aluminum oxide. In the second processing step, for example, blade dicing, laser dicing, and wire saw dicing may be employed.

Polishing Step

The method for producing a ceramic composite may include the polishing step of polishing, for example, one of the principal surfaces, after the step of eluting the aluminum oxide. The polishing step may be performed after the second processing step or before the second processing step. For example, by immersing both the principal surfaces of the sintered body in the alkali aqueous solution, a part of the fluorescent material having a composition of a rare earth aluminate embedded in the matrix is exposed on both the principal surfaces of the sintered body. In the case where a part of the fluorescent material is exposed, voids are formed among the fluorescent material, and thereby the thermal conductivity may be decreased in some cases compared to the case where the aluminum oxide exists as the matrix. For enhancing the heat radiating effect of the ceramic composite, a part of the fluorescent material exposed from at least one of the principal surfaces of the ceramic composite, which is to be in contact with another member, may be polished after eluting the aluminum oxide from the sintered body. In the case where a part of the fluorescent material exposed from the aluminum oxide is polished to flatten one of the principal surfaces of the ceramic composite, making the aluminum oxide constituting the matrix in contact with another member, heat radiated from another member can be radiated from the ceramic composite having a high thermal conductivity, so as to enhance the heat radiating effect of the ceramic composite. The sintered body after eluting the aluminum oxide may be polished, for example, with polishing paper, buffing, or diamond grindstone.

The ceramic composite according to the embodiment can be combined with a light emitting element, such as LED and LD, to constitute a light emitting device, as described, for example, in Japanese Patent Application No. 2019-130523. A light emitting device including a combination of an LD chip as an excitation light source and the ceramic composite of the embodiment as a wavelength converting member can be used as a light source for a projector.

EXAMPLES

The present disclosure is hereunder specifically described by reference to the following Examples. The present disclosure is not limited to these Examples.

Production Example of Fluorescent Material Having Composition of Rare Earth Aluminate Ia Yttrium oxide ($Y_2O_3$), cerium oxide ($CeO_2$), aluminum oxide ($Al_2O_3$), and gallium oxide ($Ga_2O_3$) were weighed to make a raw material mixture to have a molar ratio Y:Ce:Al:Ga of $0.99 \times 3:0.01 \times 3:0.99 \times 5:0.01 \times 5$, to which barium fluoride ($BaF_2$) as flux was added, and the raw material mixture and the flux were mixed with a ball mill. The mixture was placed in an alumina crucible and calcined under a reducing atmosphere at a temperature in a range of 1,400° C. to 1,600° C. for 10 hours, so as to provide a calcined material. The resulting calcined material was dispersed in pure water and passed through a wet sieve by flowing the solvent under application of various vibrations through a sieve, then dehydrated and dried, and classified through a dry sieve, so as to prepare a fluorescent material having a composition of a rare earth aluminate Ia. The average particle diameter of the fluorescent material having a composition of a rare earth aluminate Ia measured by the measurement method described later was 22 μm. The composition of the fluorescent material Ia measured by the compositional analysis described later was $(Y_{0.99}Ce_{0.01})_3(Al_{0.99}Ga_{0.01})_5O_{12}$.

Production Example of Fluorescent Material Having Composition of Rare Earth Aluminate Ib Yttrium oxide ($Y_2O_3$), gadolinium oxide ($Gd_2O_3$), cerium oxide ($CeO_2$), and aluminum oxide ($Al_2O_3$) were weighed to make a raw material mixture to have a molar ratio Y:Gd:Ce:Al of $0.87 \times 3:0.12 \times 3:0.01 \times 3:5$, to which barium fluoride ($BaF_2$) as flux was added, and the raw material mixture and the flux were mixed with a ball mill. The mixture was placed in an alumina crucible and calcined under a reducing atmosphere at a temperature in a range of 1,400° C. to 1,600° C. for 10 hours, so as to provide a calcined material. The resulting calcined material was dispersed in pure water and passed through a wet sieve by flowing the solvent under application of various vibrations through a sieve, then dehydrated and dried, and classified through a dry sieve, so as to prepare a fluorescent material having a composition of a rare earth aluminate Ib. The average particle diameter of the fluorescent material having a composition of a rare earth aluminate Ib measured by the measurement method described later was 15 μm. The composition of the fluorescent material Ib measured by the compositional analysis described later was $(Y_{0.87}Gd_{0.12}Ce_{0.01})_3Al_5O_{12}$.

Aluminum Oxide

Aluminum oxide particles having an average particle diameter of 0.5 μm (purity of aluminum oxide: 99.9% by mass) were used. The average particle diameter was measured by the method described later.

Average Particle Diameter

The average particle diameter of the fluorescent materials having a composition of a rare earth aluminate and the aluminum oxide was measured by the FSSS method. Specifically, by using Fisher Sub-Sieve Sizer Model 95 (manufactured by Fisher Scientific, Inc.), under an environment of a temperature of 25° C. and a relative humidity of 70%, 1 $cm^3$ of a specimen (i.e., the fluorescent material or the aluminum particles) was weighed and packed in a dedicated tubular vessel, to which dry air was then fed at a constant pressure, and the specific surface area was read from the differential pressure, from which the average particle diameter was calculated by the FSSS method.

Compositional Analysis

The fluorescent materials each were measured for the mass percentages (% by mass) of the rare earth element Ln, Al, and Ga, except for Ce as the activating element of the fluorescent material having a composition represented by the formula (I), with an ICP emission spectrophotometer (manufactured by Hitachi High-Tech Science Corporation), and the molar ratios of the elements were calculated from the values of mass percentage of the elements. In the fluorescent material Ia, the measured total molar ratio of Y and Ce was assumed to be 3, and the molar ratios of Al and Ga were values calculated based on the total molar ratio of Y and Ce of 3. In the fluorescent material Ib, the measured molar ratio of Al was assumed to be 5, and the molar ratios of Y, Gd, and Ce were values calculated based on the molar ratio of Al of 5.

Example 1

Step of Preparing Sintered Body

The fluorescent material having a composition of a rare earth aluminate $(Y_{0.99}Ce_{0.01})_3(Al_{0.99}Ga_{0.01})_5O_{12}$ Ia and the aluminum oxide thus prepared were weighed to make 30% by mass of the fluorescent material and 70% by mass of the aluminum oxide based on the total amount of the fluorescent material and the aluminum oxide as 100% by mass, and mixed in a dry ball mill to prepare a raw material mixture. After removing the balls used as the mixing medium from the raw material mixture, the raw material mixture was charged in a metal mold, and a molded body having a cylindrical shape having a diameter of 65 mm and a thickness of 15 mm was formed under a pressure of 10 MPa (102 kgf/cm$^2$). The resulting molded body was placed in a packaging container and vacuum-packaged, and was subjected to a CIP process at 176 MPa with a cold hydrostatic isostatic pressing machine (manufactured by Kobe Steel, Ltd.). The resulting molded body was calcined by retaining in the air atmosphere (oxygen concentration: approximately 20% by volume) at a temperature of 1,700° C. for 6 hours at a furnace (manufactured by Marusho Denki Co., Ltd.), so as to provide a sintered body. The resulting sintered body was cut with a wire saw to make a plate material having a thickness of 300 μm, and at least one of the principal surfaces of the cut sintered body in a plate form was polished to have an arithmetic average surface roughness Ha of 0.02 μm with a surface grinding machine (manufactured by Amada Wasino Co., Ltd.). The sintered body having a plate form having at least one of the principal surfaces having been polished was diced to produce a specimen of the sintered body in a plate form having a square shape having one side of 16 mm. The arithmetic average surface roughness of at least one of the principal surfaces of the sintered body was measured with a surface roughness tester (Surftest SJ-210, manufactured by Mitsutoyo Corporation). The resulting sintered body had a content of the fluorescent material Ia of 30% by mass and a content of the aluminum oxide of 70% by mass based on the total amount of the fluorescent material Ia and the aluminum oxide. The relative density of the sintered body obtained by the expressions (1) to (3) was 97%.

Step of Eluting Aluminum Oxide

Sodium hydroxide (NaOH) having a concentration of 97% by mass was prepared as a basic substance, and 4.12 g thereof was weighed, to which deionized water was added to make a total amount of 10 mL, so as to produce an alkali aqueous solution having a concentration of 40% by mass. The sintered body was contacted with the basic substance in such a manner that the specimen of the sintered body in a plate form was immersed in the alkali aqueous solution, and the alkali aqueous solution having the specimen immersed therein was placed in a vessel in an autoclave and heated to 150° C. for 24 hours. After heating, the alkali aqueous solution having the sintered body immersed therein was taken out from the autoclave, and the sintered body was taken out from the alkali aqueous solution, and then dried to provide a ceramic composite. In Examples and Comparative Examples, the dissolution amount of the fluorescent material eluted from the sintered body and the dissolution amount of the aluminum oxide eluted from the sintered body were measured by the method described later.

Examples 2 to 8

Sodium hydroxide (NaOH) having a concentration of 97% by mass was prepared as a basic substance and weighed, to which deionized water was added to produce an alkali aqueous solutions having the concentrations shown in Table 1, and the sintered body was contacted with the basic substance by immersing the specimen of the sintered body in the alkali aqueous solution. Ceramic composites of Examples were obtained in the same manner as in Example 1 except that the temperature, the period of time, and the pressure for contacting the sintered body with the basic substance were changed for Examples as shown in Table 1.

Comparative Example 1

The specimen of the sintered body in Example 1 was designated as a ceramic composite without contacting with an alkali aqueous solution.

Comparative Examples 2 and 3

Sodium hydroxide (NaOH) having a concentration of 97% by mass was prepared as a basic substance, and 4.12 g or 8.25 g thereof was weighed, to which deionized water was added to make a total amount of 10 mL or 20 mL, so as to produce an alkali aqueous solution having a concentration of 40% by mass, and the sintered body was contacted with the basic substance by immersing the specimen of the sintered body in the alkali aqueous solution. Ceramic composites of Comparative Examples were obtained in the same manner as in Example 1 except that the temperature, the period of time, and the pressure for contacting the sintered body with the basic substance were changed for Comparative Examples as shown in Table 1.

Comparative Example 4

Sulfuric acid (H$_2$SO$_4$) having a concentration of 95% by mass was prepared as an acidic substance, and 20 mL thereof was weighed and designated as an acid aqueous solution. The specimen of the sintered body was immersed in the acid aqueous solution placed in a Teflon vessel. The sintered body was contacted with the acidic substance by heating the acid aqueous solution having the specimen of the sintered body immersed therein to 200° C. under the atmospheric pressure (approximately 101 kPa) for 1 hour, and the sintered body was taken out from the acid aqueous solution, and then dried to provide a ceramic composite.

Example 9

Step of Preparing Sintered Body

A specimen of a sintered body was produced in the same manner as in Example 1 except that the fluorescent material having a composition of a rare earth aluminate $(Y_{0.87}Gd_{0.12}Ce_{0.01})_3Al_5O_{12}$ Ib and the aluminum oxide thus prepared were weighed to make 10% by mass of the fluorescent material and 90% by mass of the aluminum oxide based on the total amount of the fluorescent material and the aluminum oxide as 100% by mass, and mixed in a dry ball mill to prepare a raw material mixture, and the resulting raw material mixture was used. The resulting sintered body had a content of the fluorescent material Ib of 10% by mass and a content of the aluminum oxide of 90% by mass based on the total amount of the fluorescent material Ib and the aluminum oxide. The relative density of the sintered body obtained by the expressions (1) to (3) was 100%.

Step of Eluting Aluminum Oxide

Sodium hydroxide (NaOH) having a concentration of 97% by mass was prepared as a basic substance, and 4.12 g thereof was weighed, to which deionized water was added to make a total amount of 10 mL, so as to produce an alkali aqueous solution having a concentration of 40% by mass. The sintered body was contacted with the basic substance in such a manner that the specimen of the sintered body in a plate form was immersed in the alkali aqueous solution, and the alkali aqueous solution having the specimen immersed therein was placed in a vessel in an autoclave and heated to 150° C. for 24 hours. After heating, the alkali aqueous solution having the sintered body immersed therein was taken out from the autoclave, and the sintered body was taken out from the alkali aqueous solution, and then dried to provide a ceramic composite.

Examples 10 and 11

Sodium hydroxide (NaOH) having a concentration of 97% by mass was prepared as a basic substance and weighed, to which deionized water was added to produce an alkali aqueous solutions having the concentrations shown in Table 2, and the sintered body was contacted with the basic substance by immersing the specimen of the sintered body in the alkali aqueous solution. Ceramic composites according to Examples were obtained in the same manner as in Example 9 except that the temperature and the period of time for contacting the sintered body with the basic substance were changed for Examples as shown in Table 2.

Comparative Example 5

The specimen of the sintered body in Example 9 was designated as a ceramic composite without contacting with an alkali aqueous solution.

Comparative Example 6

Phosphoric acid ($H_3PO_4$) having a concentration of 85% by mass was prepared as an acidic substance, and 20 mL thereof was weighed and designated as an acid aqueous solution. The specimen of the sintered body was immersed in the acid aqueous solution placed in a Teflon vessel. The sintered body was contacted with the acidic substance by heating the acid aqueous solution having the specimen of the sintered body immersed therein to 200° C. under the atmospheric pressure (approximately 101 kPa) for 1 hour, and the sintered body was taken out from the acid aqueous solution, and then dried to provide a ceramic composite.

Dissolution Amount of Fluorescent Material Eluted from Sintered Body

In Examples and Comparative Examples, the amount of the rare earth element Ln (specifically Y or Gd) dissolved in the alkali aqueous solution or the acid aqueous solution, from which the sintered body had been taken out, was measured by ICP-AES with an ICP emission spectrophotometer (SPS 3500, manufactured by Hitachi High-Tech Science Corporation), and the dissolution amount of the fluorescent material eluted in the alkali aqueous solution or the acid aqueous solution based on the amount of the fluorescent material contained in the sintered body as 100% by mass was calculated by the expression (4). In the expression (4), in the case where the sintered body was contacted with the acidic substance, the calculation was performed by replacing the alkali aqueous solution by the acid aqueous solution. The coefficient Kc1 in the expression (4) was calculated by the expression (5).

Amount of Aluminum Oxide ($Al_2O_3$) in Dissolution Amount of Fluorescent Material Eluted from Sintered Body The amount of the aluminum oxide ($Al_2O_3$) in the dissolution amount of the fluorescent material eluted from the sintered body was obtained in such a manner that the amount of the rare earth element Ln (specifically Y or Gd) dissolved in the alkali aqueous solution or the acid aqueous solution, from which the sintered body had been taken out, was measured by ICP-AES with the ICP emission spectrophotometer, and the amount (% by mass) of the aluminum oxide ($Al_2O_3$) in the dissolution amount of the fluorescent material was calculated by the expression (6). In the expression (6), in the case where the sintered body was contacted with the acidic substance, the calculation was performed by replacing the alkali aqueous solution by the acid aqueous solution. The coefficient Kc2 in the expression (6) was calculated by the expression (7).

Dissolution Amount of Aluminum Oxide ($Al_2O_3$) Eluted from Sintered Body

The dissolution amount of the aluminum oxide ($Al_2O_3$) eluted from the sintered body was obtained in such a manner that the amount of aluminum (Al) eluted in the alkali aqueous solution or the acid aqueous solution, from which the sintered body had been taken out, was measured by ICP-AES with an ICP emission spectrophotometer (SPS 3500, manufactured by Hitachi High-Tech Science Corporation), from which the amount of $Al_2O_3$ in the dissolution amount of the fluorescent material eluted from the sintered body was subtracted. The dissolution amount of the aluminum oxide ($Al_2O_3$) eluted from the sintered body was expressed in terms of mass ratio based on the amount of the aluminum oxide ($Al_2O_3$) contained in the sintered body as 100% by mass. Specifically, the dissolution amount of the aluminum oxide ($Al_2O_3$) eluted from the sintered body was calculated by the expression (8). In the expression (8), in the case where the sintered body was contacted with the acidic substance, the calculation was performed by replacing the alkali aqueous solution by the acid aqueous solution.

Relative Luminous Flux

For each of the ceramic composites of Examples and Comparative Examples, the ceramic composite was irradiated with excitation light having a wavelength of 450 nm, light emitted from the ceramic composite was spectrally dispersed and measured for the light emission spectrum at room temperature (25° C.±5° C.) with a quantum efficiency measurement system (QE-2000, manufactured by Otsuka Electronics Co., Ltd.), and the luminous flux (lm) was obtained from the light emission spectrum. For the ceramic composites according to Examples 1 to 8 and the ceramic composites according to Comparative Examples 1 to 4, the luminous fluxes of the ceramic composites according to Examples and Comparative Examples each were obtained as a relative luminous flux, which was a relative value with respect to the luminous flux of the ceramic composite according to Comparative Example 1 as 100%. The results are shown in Table 1. For the ceramic composites according to Examples 9 to 11 and the ceramic composites according to Comparative Examples 5 and 6, the luminous fluxes of the ceramic composites according to Examples and Comparative Examples each were obtained as a relative luminous flux, which was a relative value with respect to the luminous flux of the ceramic composite according to Comparative Example 5 as 100%. The results are shown in Table 2.

SEM Micrograph

SEM micrograph of the surfaces of the ceramic composites according to Examples 1 and 3 and Comparative Examples 1, 2, 4, 5, and 6 were obtained with a scanning electron microscope (which may be referred to as SEM in the description herein). SEM micrographs of the cross-sectional surfaces of the ceramic composites according to Examples 1 and 3 and Comparative Example 2 were obtained.

tive luminous flux, as compared to the ceramic composite of Comparative Example 1 having no aluminum oxide eluted.

In the ceramic composites according to Comparative Examples 2 and 3, the dissolution amount of the eluted aluminum oxide exceeded 30% by mass based on the amount of the aluminum oxide contained in the sintered body, and the amount of the fluorescent material exposed from the matrix was increased to lower the relative luminous flux.

In the ceramic composite according to Comparative Example 4, the sintered body was contacted with the acidic

TABLE 1

|  | NaOH concentration (% by mass) | NaOH amount (mL) | Contact temperature (° C.) | Contact time (hr) | Contact pressure (kPa) | $Al_2O_3$ dissolution amount (% by mass) | Fluorescent material dissolution amount (% by mass) | Relative luminous flux (%) |
|---|---|---|---|---|---|---|---|---|
| Example 1 | 40 | 10 | 150 | 24 | 480 | 1.5 | 0.06 | 102.7 |
| Example 2 | 40 | 20 | 150 | 24 | 480 | 1.6 | 0.06 | 101.0 |
| Example 3 | 40 | 10 | 180 | 24 | 1000 | 17.5 | 0.16 | 101.5 |
| Example 4 | 40 | 20 | 180 | 24 | 1000 | 21.7 | 0.18 | 101.7 |
| Example 5 | 60 | 10 | 150 | 48 | 480 | 2.9 | 0.16 | 101.6 |
| Example 6 | 60 | 20 | 150 | 48 | 480 | 2.8 | 0.14 | 103.0 |
| Example 7 | 60 | 10 | 150 | 48 | 480 | 2.0 | 0.12 | 101.4 |
| Example 8 | 60 | 20 | 150 | 48 | 480 | 1.4 | 0.11 | 102.3 |
| Comparative Example 1 | — | — | — | — | — | 0.0 | 0.00 | 100.0 |
| Comparative Example 2 | 40 | 10 | 180 | 48 | 1000 | 52.3 | 0.52 | 94.2 |
| Comparative Example 3 | 40 | 20 | 180 | 48 | 1000 | 56.0 | 0.61 | 94.8 |
| Comparative Example 4 | 95 (sulfuric acid) | 20 (sulfuric acid) | 200 | 1 | atmospheric pressure (101) | 0.3 | 5.40 | 89.7 |

In the ceramic composites according to Examples 1 to 8, since the sintered body contained the aluminum oxide in an amount in a range of 50% by mass or more and 80% by mass or less, and the dissolution amount of the eluted aluminum oxide was in a range of 0.2% by mass or more and 30% by mass or less based on the amount of the aluminum oxide contained in the sintered body, a part of the fluorescent material having a composition of a rare earth aluminate embedded in the matrix on the surface of the sintered body was exposed to the surface of the sintered body through elution of the aluminum oxide as the matrix of the sintered body. In the ceramic composites according to Examples 1 to 8, the scattering of light was increased by the voids formed in the interior of the sintered body through elution of a part of the aluminum oxide inside the sintered body, and thus the amount of light subjected to the wavelength conversion by the fluorescent material was increased to enhance the relasubstance, and thus the dissolution amount of the fluorescent material contained in the sintered body became larger than the dissolution amount of the aluminum oxide contained therein, so as to lower the relative luminous flux.

Figure 2:
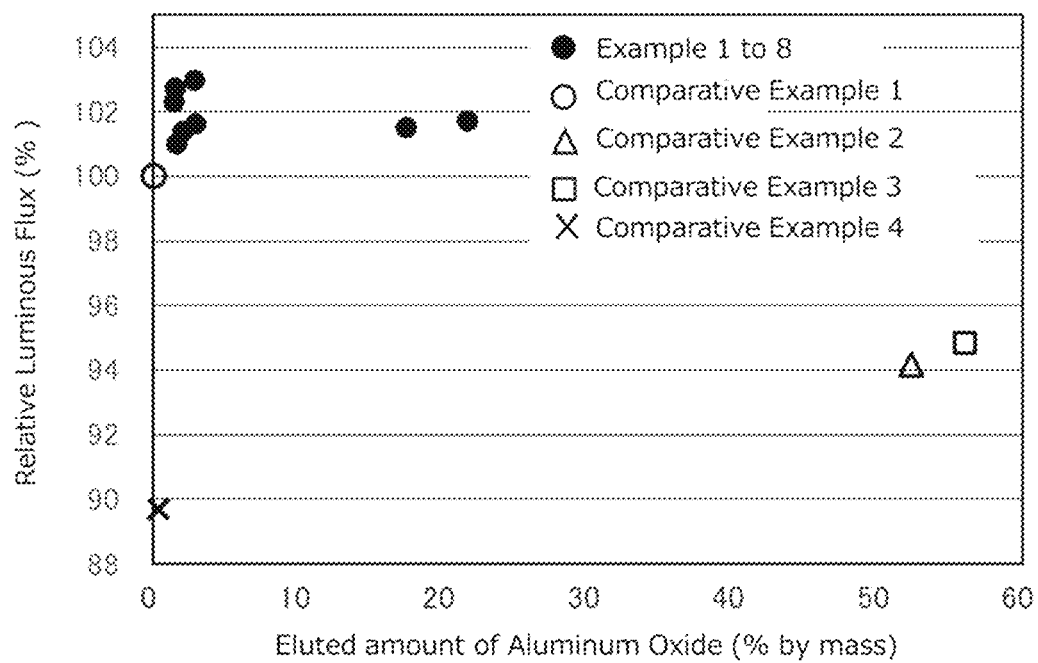
FIG. 2 is a graph showing a relationship between the dissolution amount of aluminum oxide eluted from the sintered bodies of Examples 1 to 8 and the sintered bodies of Comparative Examples 1 to 4, and the relative luminous fluxes of the ceramic composites.

FIG. 2 is a graph showing the relationship between the dissolution amount (% by mass) of the aluminum oxide eluted from the sintered body and the relative luminous flux (%) in Examples 1 to 8 and Comparative Examples 1 to 4. In the ceramic composites according to Examples 1 to 8, the dissolution amount of the aluminum oxide eluted from the sintered body was in a range of 0.2% by mass or more and 30% by mass or less, and thus the relative luminous flux was enhanced as compared to the ceramic composite of Comparative Example 1 having no aluminum oxide eluted from the sintered body.

TABLE 2

|  | NaOH concentration (% by mass) | NaOH amount (mL) | Contact temperature (° C.) | Contact time (hr) | Contact pressure (kPa) | $Al_2O_3$ dissolution amount (% by mass) | Fluorescent material dissolution amount (% by mass) | Relative luminous flux (%) |
|---|---|---|---|---|---|---|---|---|
| Example 9 | 40 | 10 | 150 | 24 | 480 | 0.5 | 0.05 | 101.9 |
| Example 10 | 40 | 10 | 160 | 24 | 620 | 1.0 | 0.20 | 100.9 |
| Example 11 | 40 | 10 | 160 | 48 | 620 | 2.8 | 0.08 | 100.2 |
| Comparative Example 5 | — | — | — | — | — | 0.0 | 0.0 | 100.0 |
| Comparative Example 6 | 85 (phosphoric acid) | 20 (phosphoric acid) | 200 | 1 | atmospheric pressure (101) | 0.1 | 3.8 | 91.2 |

In the ceramic composites according to Examples 9 to 11, the sintered body contained the aluminum oxide in an amount in a range of 80% by mass or more and 99% by mass or less, and the dissolution amount of the eluted aluminum oxide was in a range of 0.2% by mass or more and 3% by mass or less based on the amount of the aluminum oxide contained in the sintered body. In the ceramic composites according to Examples 9 to 11, the relative luminous flux was larger than the ceramic composite according to Comparative Example 5.

In the ceramic composite according to Comparative Example 6, the sintered body was contacted with the acidic substance, and thus the dissolution amount of the fluorescent material contained in the sintered body became larger than the dissolution amount of the aluminum oxide contained therein, so as to lower the relative luminous flux.

Figure 3:
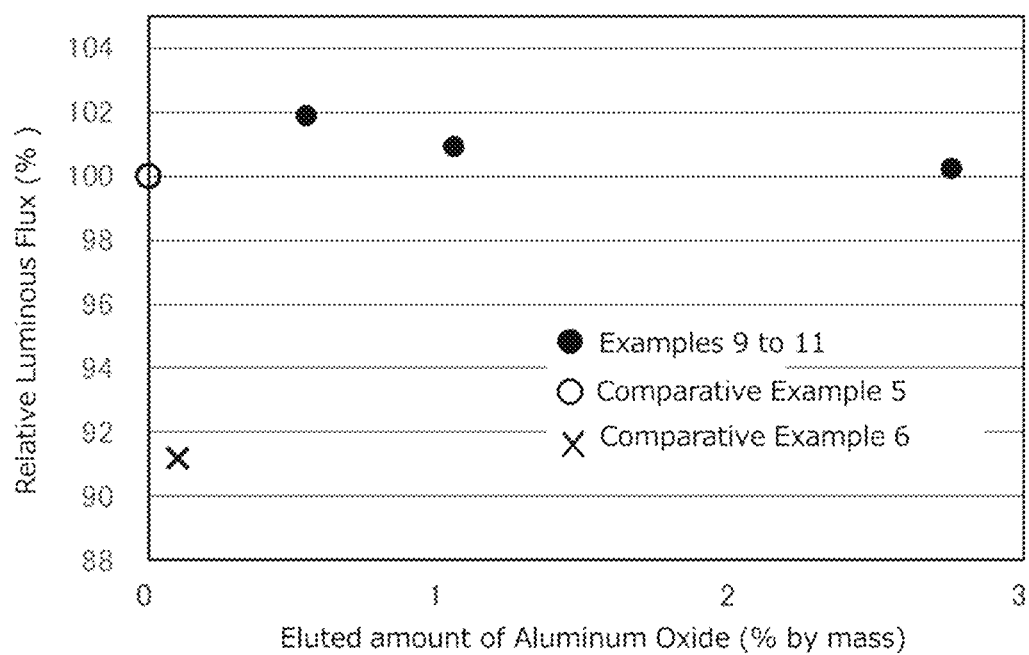
FIG. 3 is a graph showing a relationship between the dissolution amount of aluminum oxide eluted from the sintered bodies of Examples 9 to 11 and the sintered bodies of Comparative Examples 5 and 6, and the relative luminous fluxes of the ceramic composites.

FIG. 3 is a graph showing the relationship between the dissolution amount (% by mass) of the aluminum oxide eluted from the sintered body and the relative luminous flux (%) in Examples 9 to 11 and Comparative Examples 5 and 6. In the ceramic composites according to Examples 9 to 11, the dissolution amount of the aluminum oxide eluted from the sintered body was in a range of 0.2% by mass or more and 3% by mass or less, and thus the relative luminous flux was enhanced as compared to the ceramic composite of Comparative Example 5 having no aluminum oxide eluted from the sintered body.

Figure 4:
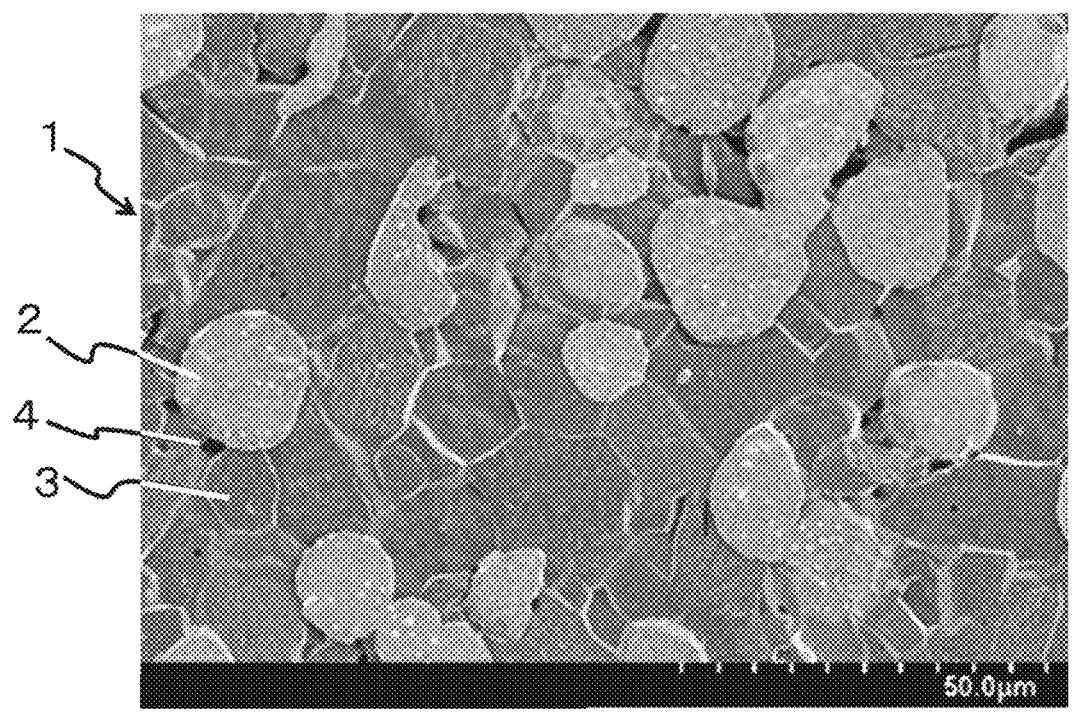
FIG. 4 is a SEM micrograph of a surface of the ceramic composite according to Example 1.
Figure 5:
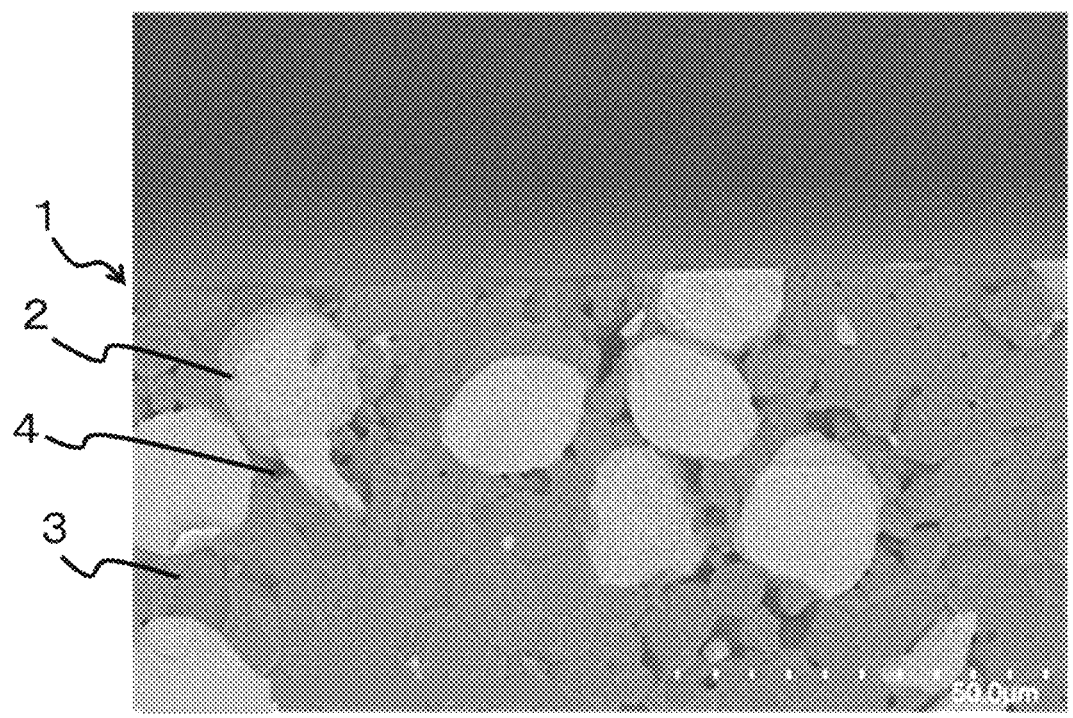
FIG. 5 is a SEM micrograph of a cross-sectional surface of the ceramic composite according to Example 1.

FIG. 4 is a SEM image of a surface of a ceramic composite 1 according to Example 1, and FIG. 5 is a SEM micrograph of a cross-sectional surface of the ceramic composite 1 according to Example 1. In FIGS. 4 and 5, the ceramic composite 1, a fluorescent material 2 having a composition of a rare earth aluminate, and an aluminum oxide 3 constituting the matrix were confirmed. It was confirmed in the aluminum oxide 3 constituting the matrix that the particles of the aluminum oxide 3 each were partitioned by the crystal grain boundary. As shown in FIGS. 4 and 5, on the surface of the ceramic composite 1, a part of the fluorescent material 2 having a composition of a rare earth aluminate was exposed from the matrix of the aluminum oxide 3. As shown in FIG. 5, inside the ceramic composite 1, voids 4 were formed through elution of the aluminum oxide 3. In the ceramic composite 1 according to Example 1, the voids 4 were formed through elution of a part of the aluminum oxide 3 constituting the matrix, light was efficiently scattered with the voids 4, the scattered light was efficiently subjected to the wavelength conversion by the fluorescent material 2, a part of which was exposed in the surface direction on the surface of the ceramic composite 1 from the aluminum oxide, and thus the relative luminous flux of the ceramic composite was enhanced.

Figure 6:
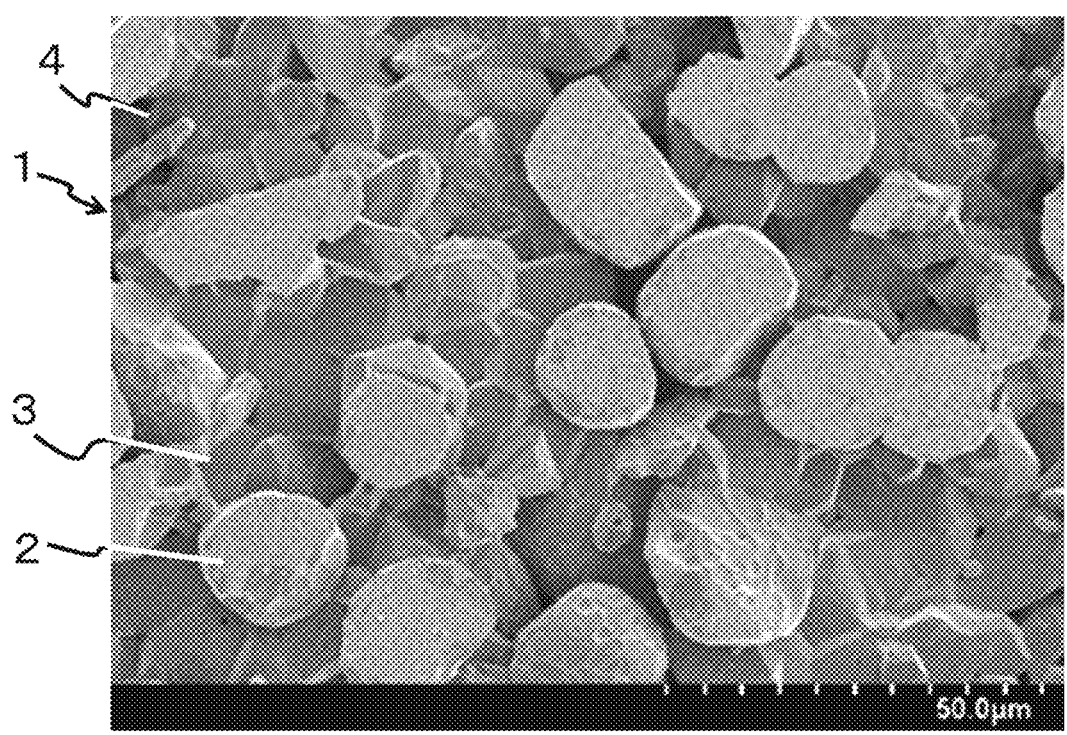
FIG. 6 is a SEM micrograph of a surface of the ceramic composite according to Example 3.
Figure 7:
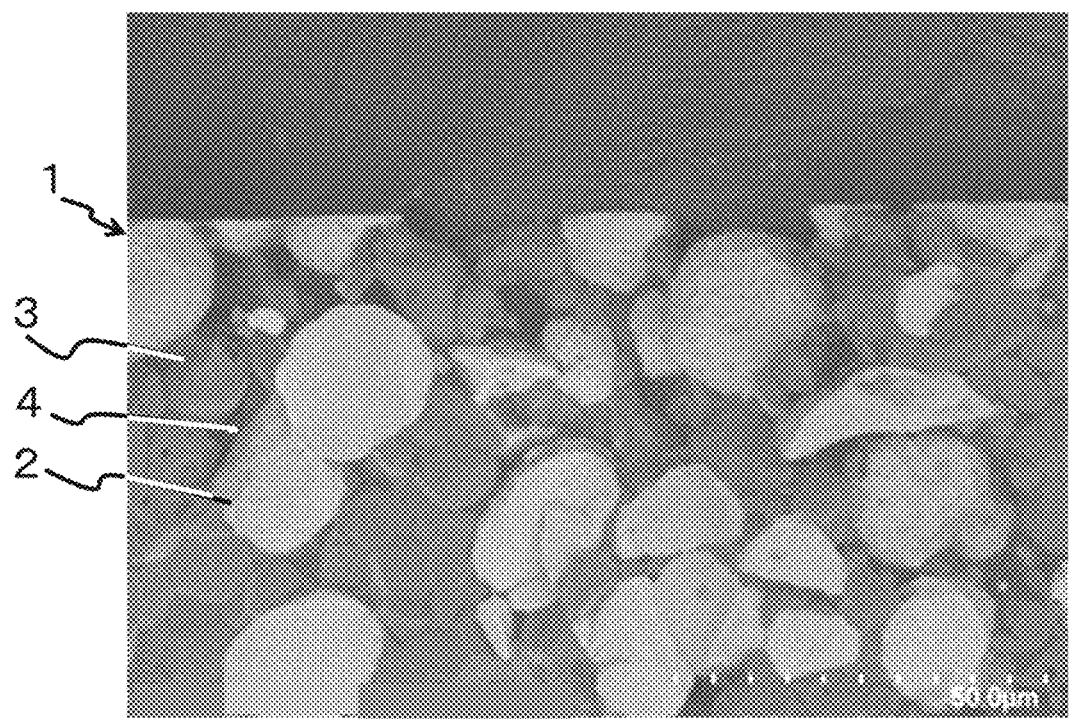
FIG. 7 is a SEM micrograph of a cross-sectional surface of the ceramic composite according to Example 3.

FIG. 6 is a SEM image of a surface of the ceramic composite 1 according to Example 3, and FIG. 7 is a SEM micrograph of a cross-sectional surface of the ceramic composite 1 according to Example 3. In FIGS. 6 and 7, the ceramic composite 1, the fluorescent material 2 having a composition of a rare earth aluminate, and the aluminum oxide 3 constituting the matrix were confirmed. It was confirmed in the aluminum oxide 3 constituting the matrix that the particles of the aluminum oxide 3 each were partitioned by the crystal grain boundary. As shown in FIGS. 6 and 7, on the surface of the ceramic composite 1 according to Example 3, a part of the fluorescent material 2 having a composition of a rare earth aluminate was exposed from the matrix of the aluminum oxide 3, and in Example 3 having the dissolution amount of the aluminum oxide that was larger than Example 1, the exposed part of the fluorescent material 2 was larger than Example 1 on the surface of the ceramic composite 1. In the ceramic composite 1 according to Example 3, a larger amount of voids 4 were formed inside the ceramic composite 1 through elution of a part of the aluminum oxide 3 constituting the matrix than the ceramic composite according to Example 1.

Figure 8:
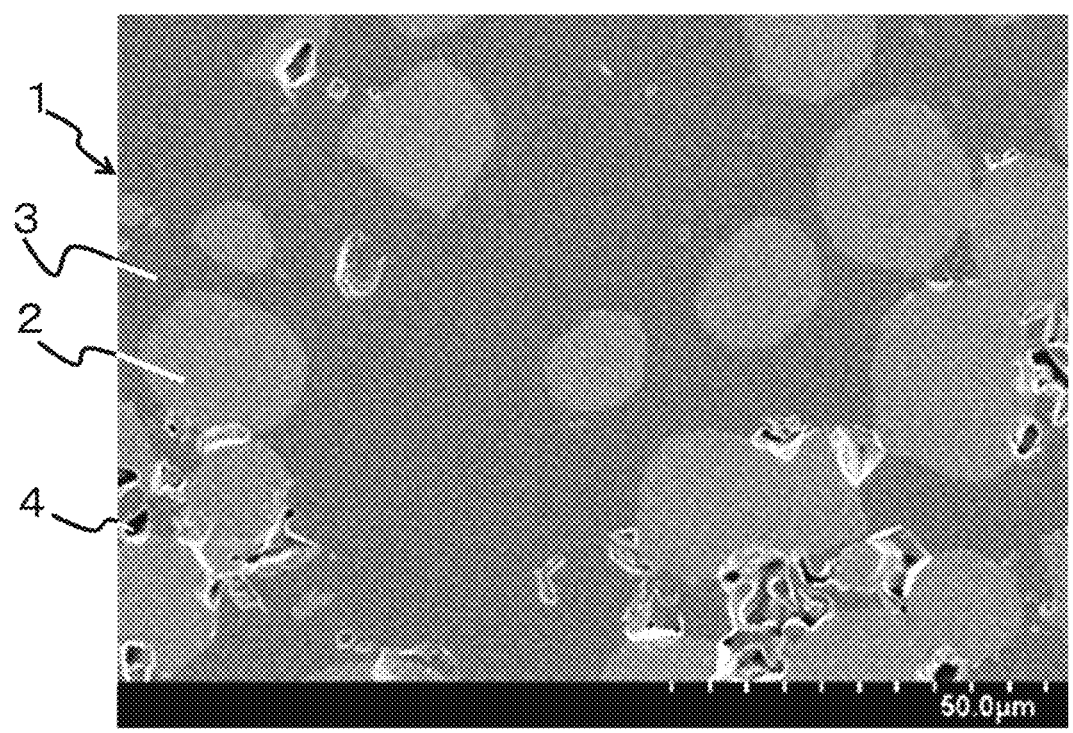
FIG. 8 is a SEM micrograph of a surface of the ceramic composite according to Comparative Example 1.

FIG. 8 is a SEM micrograph of a surface of the ceramic composite 1 according to Comparative Example 1. In FIG. 8, it was confirmed that the fluorescent material 2 having a composition of a rare earth aluminate was not exposed from the surface of the ceramic composite 1, and the aluminum oxide 3 constituting the matrix and the fluorescent material 2 constituted the flat surface. In the ceramic composite of Comparative Example 1, the sintered body was not contacted with a basic substance or an acidic substance and had a relative density of 97%, and thus the voids 4 existed on the surface of the ceramic composite 1.

Figure 9:
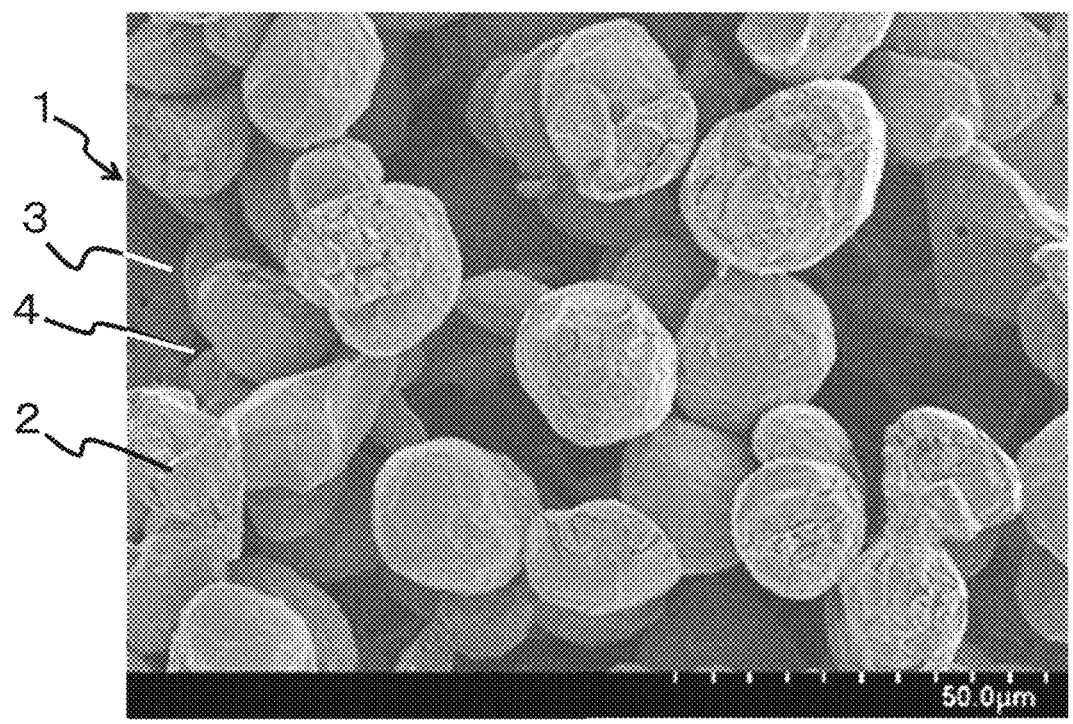
FIG. 9 is a SEM micrograph of a surface of the ceramic composite according to Comparative Example 2.
Figure 10:
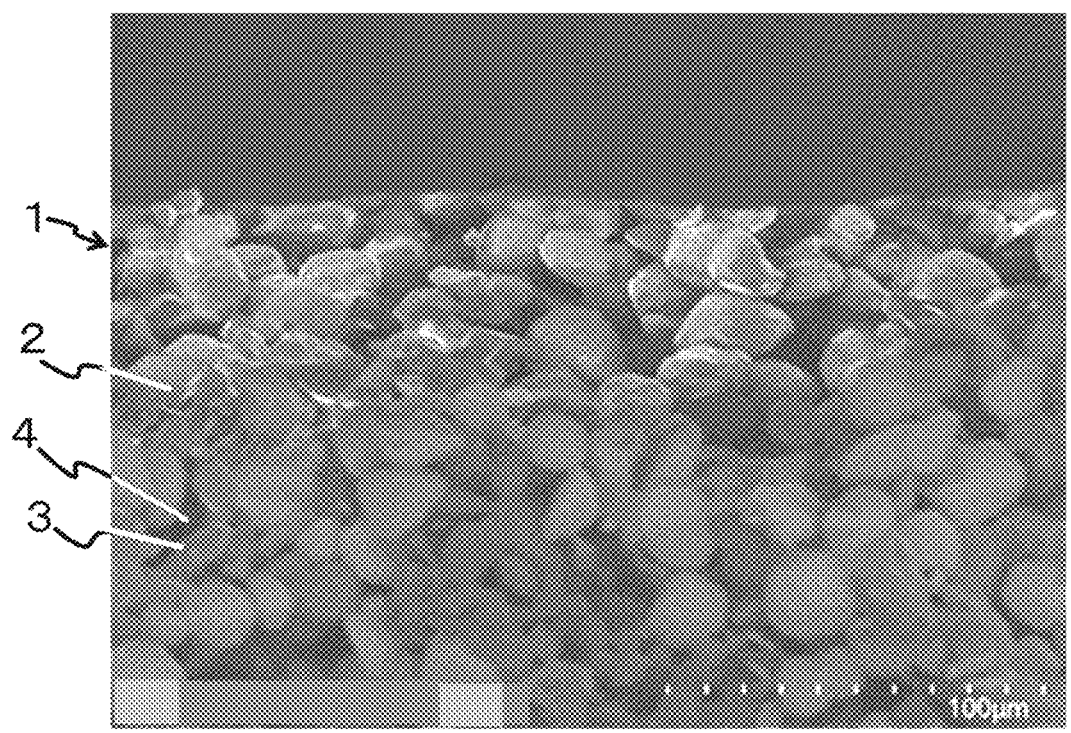
FIG. 10 is a SEM micrograph of a cross-sectional surface of the ceramic composite according to Comparative Example 2.

FIG. 9 is a SEM micrograph of a surface of the ceramic composite 1 according to Comparative Example 2, and FIG. 10 is a SEM micrograph of a cross-sectional surface of the ceramic composite 1 according to Comparative Example 2. As shown in FIGS. 9 and 10, in the ceramic composite 1 of Comparative Example 2 having a large dissolution amount of the aluminum oxide 3, the part of the fluorescent material 2 exposed from the aluminum oxide 3 as the matrix was increased on the surface of the ceramic composite 1, and in the interior of the ceramic composite 1, the amount of the voids 4 formed through elution of the aluminum oxide was increased. In the case where the dissolution amount of the aluminum oxide exceeded 30% by mass as in Comparative Example 2, the amount of the fluorescent material 2 exposed from the matrix constituted by the aluminum oxide was increased due to the too large dissolution amount of the aluminum oxide, and the scattering of light by the voids became too large so that the relative luminous flux was lowered. The ceramic composite according to Comparative Example 2 had a large amount of the voids 4 due to the large dissolution amount of the aluminum oxide.

Figure 11:
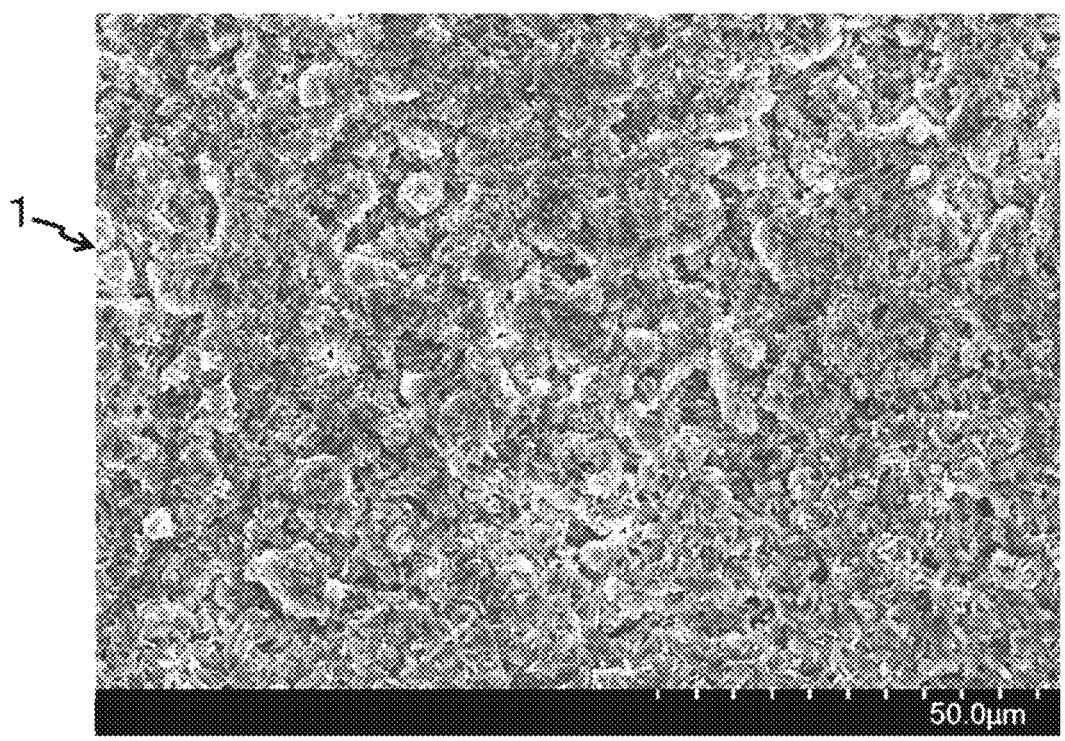
FIG. 11 is a SEM micrograph of a surface of the ceramic composite according to Comparative Example 4.

FIG. 11 is a SEM micrograph of a surface of the ceramic composite 1 according to Comparative Example 4. In the ceramic composite 1 according to Comparative Example 4, since the sintered body was contacted with the acidic substance by immersing in the acid solution containing sulfuric acid, the dissolution amount of the fluorescent material was larger than the dissolution amount of the aluminum oxide, resulting in a roughened surface on the surface of the ceramic composite 1.

Figure 12:
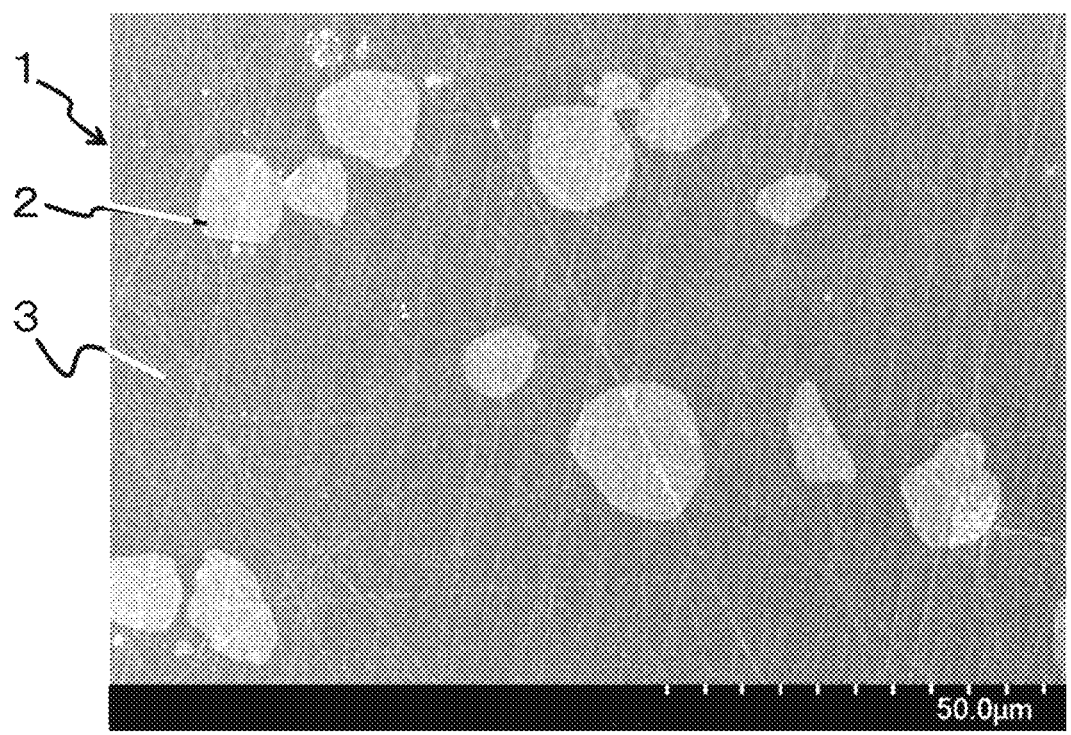
FIG. 12 is a SEM micrograph of a surface of the ceramic composite according to Comparative Example 5.

FIG. 12 is a SEM micrograph of a surface of the ceramic composite 1 according to Comparative Example 5. In the ceramic composite 1 according to Comparative Example 5, the sintered body was not contacted with a basic substance or an acidic substance, and due to the high relative density of the sintered body of 100%, the fluorescent material 2 and the aluminum oxide 3 were confirmed, but no void was confirmed, on the surface thereof.

Figure 13:
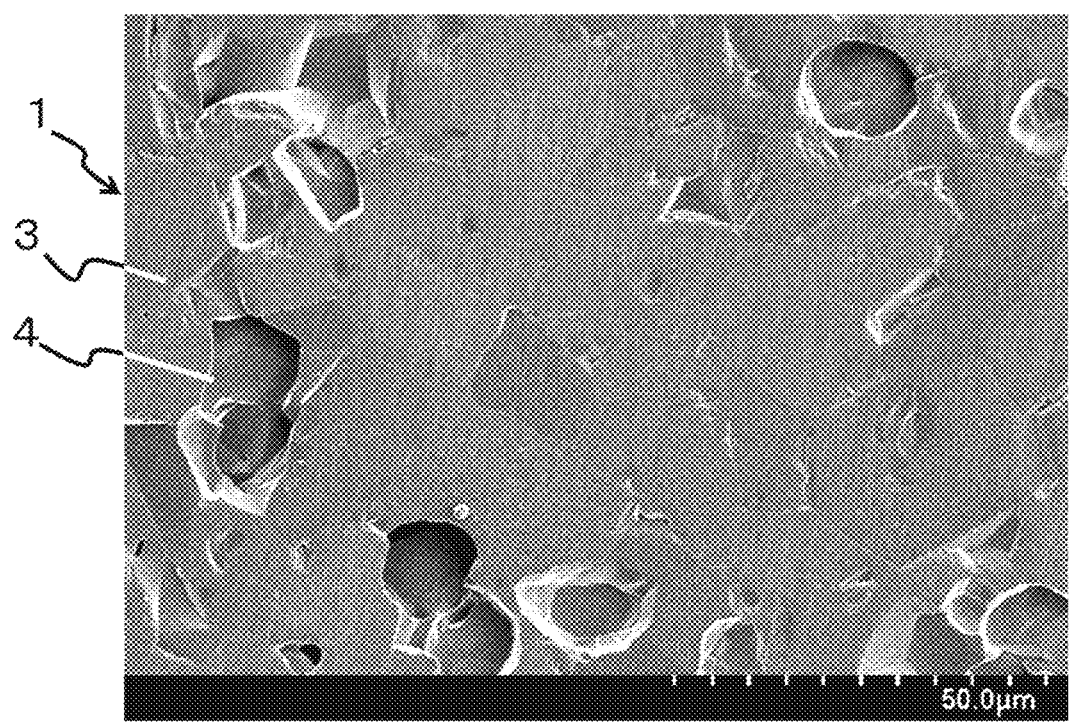
FIG. 13 is a SEM micrograph of a surface of the ceramic composite according to Comparative Example 6.

FIG. 13 is a SEM micrograph of a surface of the ceramic composite 1 according to Comparative Example 6. In the ceramic composite 1 according to Comparative Example 6, since the sintered body was contacted with the acidic substance by immersing in the acid solution containing phosphoric acid, the aluminum oxide 3 contained in the sintered body was substantially not eluted, whereas the fluorescent material existing on the surface of the sintered body was eluted, and thus the parts where the fluorescent material had existed became the voids 4 while retaining the shapes thereof.

The ceramic composite according to one embodiment of the present disclosure can be applied to a wavelength converting member to be combined with a light emitting element in a light emitting device for an interior illumination and an illumination for a vehicle, a light emitting device as a backlight for a liquid crystal device and a light source for a projector.

The invention claimed is:

1. A method for producing a ceramic composite, comprising:
   preparing a sintered body in a plate form containing a fluorescent material having a composition of a rare earth aluminate, and aluminum oxide; and
   eluting the aluminum oxide from the sintered body by contacting the sintered body with a basic substance contained in an alkali aqueous solution under a pressure in a range of 150 kPa or more and 1,600 kPa or less in terms of gauge pressure,
   a dissolution amount of the fluorescent material eluted from the sintered body in the step of eluting the aluminum oxide being 0.5% by mass or less based on an amount of the fluorescent material contained in the sintered body as 100% by mass.

2. The method for producing a ceramic composite according to claim 1, wherein in the step of eluting the aluminum oxide, the sintered body is contacted with the basic substance at a temperature in a range of 120° C. or more and 200° C. or less.

3. The method for producing a ceramic composite according to claim 1, wherein in the step of eluting the aluminum oxide, the sintered body is contacted with the basic substance for a period of time of 1 hour or more and 96 hours or less.

4. The method for producing a ceramic composite according to claim 1, wherein in the step of eluting the aluminum oxide, the basic substance contains at least one selected from the group consisting of sodium hydroxide, potassium hydroxide, and lithium hydroxide.

5. The method for producing a ceramic composite according to claim 1, wherein in the step of eluting the aluminum oxide, the alkali aqueous solution contains the basic substance in an amount in a range of 3% by mass or more and 70% by mass or less.

6. The method for producing a ceramic composite according to claim 1, wherein in the step of preparing the sintered body, the sintered body contains the aluminum oxide in an amount in a range of 50% by mass or more and 99% by mass or less.

7. The method for producing a ceramic composite according to claim 1, wherein in the step of preparing the sintered body, the sintered body contains the aluminum oxide in an amount in a range of 50% by mass or more and less than 80% by mass, and
   in the step of eluting the aluminum oxide, a dissolution amount of the aluminum oxide eluted from the sintered body is in a range of 0.2% by mass or more and 30% by mass or less based on an amount of the aluminum oxide contained in the sintered body as 100% by mass.

8. The method for producing a ceramic composite according to claim 1, wherein in the step of preparing the sintered body, the sintered body contains the aluminum oxide in an amount in a range of 80% by mass or more and 99% by mass or less, and
   in the step of eluting the aluminum oxide, a dissolution amount of the aluminum oxide eluted from the sintered body is in a range of 0.2% by mass or more and 3% by mass or less based on an amount of the aluminum oxide contained in the sintered body as 100% by mass.

9. The method for producing a ceramic composite according to a claim 1, wherein in the step of preparing the sintered body, the fluorescent material has a composition represented by the following formula (I):

$$(Ln_{1-a}Ce_a)_3(Al_cGa_b)_5O_{12} \quad (I)$$

wherein in the formula (I), Ln represents at least one kind of a rare earth element selected from the group consisting of Y, Lu, Gd, and Tb, and a, b, and c satisfy $0 < a \leq 0.22$, $0 \leq b \leq 0.4$, $0 < c \leq 1.1$, and $0.9 \leq b+c \leq 1.1$.

10. The method for producing a ceramic composite according to claim 1, wherein the method comprises preparing the sintered body in the plate form containing the fluorescent material having the composition of the rare earth aluminate, and aluminum oxide, the sintered body having a relative density of 90% or more.

11. A method for producing a ceramic composite, comprising:
   preparing a sintered body in a plate form containing a fluorescent material having a composition of a rare earth aluminate, and aluminum oxide; and
   eluting the aluminum oxide from the sintered body by contacting the sintered body with a basic substance contained in an alkali aqueous solution,
   a dissolution amount of the fluorescent material eluted from the sintered body in the step of eluting the aluminum oxide being 0.5% by mass or less based on an amount of the fluorescent material contained in the sintered body as 100% by mass,
   wherein in the step of preparing the sintered body, the sintered body contains the aluminum oxide in an amount in a range of 80% by mass or more and 99% by mass or less, and
   in the step of eluting the aluminum oxide, a dissolution amount of the aluminum oxide eluted from the sintered body is in a range of 0.2% by mass or more and 3% by mass or less based on an amount of the aluminum oxide contained in the sintered body as 100% by mass.

12. The method for producing a ceramic composite according to claim 11, wherein in the step of eluting the aluminum oxide, the sintered body is contacted with the basic substance at a temperature in a range of 120° C. or more and 200° C. or less.

13. The method for producing a ceramic composite according to claim 11, wherein in the step of eluting the aluminum oxide, the sintered body is contacted with the basic substance under a pressure in a range of 150 kPa or more and 1,600 kPa or less in terms of gauge pressure.

14. The method for producing a ceramic composite according to claim 11, wherein in the step of eluting the aluminum oxide, the sintered body is contacted with the basic substance for a period of time of 1 hour or more and 96 hours or less.

15. The method for producing a ceramic composite according to claim 11, wherein in the step of eluting the aluminum oxide, the basic substance contains at least one selected from the group consisting of sodium hydroxide, potassium hydroxide, and lithium hydroxide.

16. The method for producing a ceramic composite according to claim 11, wherein in the step of eluting the aluminum oxide, the alkali aqueous solution contains the basic substance in an amount in a range of 3% by mass or more and 70% by mass or less.

17. The method for producing a ceramic composite according to a claim 11, wherein in the step of preparing the sintered body, the fluorescent material has a composition represented by the following formula (I):

$$(Ln_{1-a}Ce_a)_3(Al_cGa_b)_5O_{12} \qquad (I)$$

wherein in the formula (I), Ln represents at least one kind of a rare earth element selected from the group consisting of Y, Lu, Gd, and Tb, and a, b, and c satisfy $0 < a \le 0.22$, $0 \le b \le 0.4$, $0 < c \le 1.1$, and $0.9 \le b+c \le 1.1$.

18. The method for producing a ceramic composite according to claim 11, wherein the method comprises preparing the sintered body in the plate form containing the fluorescent material having the composition of the rare earth aluminate, and aluminum oxide, the sintered body having a relative density of 90% or more.

\* \* \* \* \*